United States Patent
Roberts et al.

(10) Patent No.: US 7,253,852 B2
(45) Date of Patent: Aug. 7, 2007

(54) POLARIZER REMOVAL IN A MICRODISPLAY SYSTEM

(75) Inventors: William Roberts, North Attleboro, MA (US); Matthew Zavracky, Plympton, MA (US)

(73) Assignee: Kopin Corporation, Taunton, MA (US)

( * ) Notice: Subject to any disclaimer, the term of this patent is extended or adjusted under 35 U.S.C. 154(b) by 128 days.

(21) Appl. No.: 09/843,534

(22) Filed: Apr. 25, 2001

(65) Prior Publication Data

US 2002/0191127 A1    Dec. 19, 2002

(51) Int. Cl.
G02F 1/1333    (2006.01)
(52) U.S. Cl. .......................... 349/58; 349/96
(58) Field of Classification Search ................ 349/96, 349/58
See application file for complete search history.

(56) References Cited

U.S. PATENT DOCUMENTS

| | | | |
|---|---|---|---|
| 4,297,022 A | 10/1981 | Lester | 355/3 R |
| 4,388,375 A * | 6/1983 | Hopper et al. | 428/423.7 |
| 4,660,936 A * | 4/1987 | Nosker | 349/67 |
| 4,977,456 A | 12/1990 | Furuya | 358/213.13 |
| 5,211,463 A | 5/1993 | Kalmanash | 362/26 |
| 5,300,976 A | 4/1994 | Lim et al. | 354/219 |
| 5,422,751 A | 6/1995 | Lewis et al. | |
| 5,440,197 A | 8/1995 | Gleckman | 313/110 |
| 5,508,830 A | 4/1996 | Imoto et al. | 359/40 |
| 5,508,834 A * | 4/1996 | Yamada et al. | 349/58 |
| 5,659,376 A * | 8/1997 | Uehara et al. | 349/58 |
| 5,684,354 A | 11/1997 | Gleckman | 313/110 |
| 5,709,463 A | 1/1998 | Igram | 362/268 |
| 5,889,567 A | 3/1999 | Swanson et al. | 349/62 |
| 5,892,325 A | 4/1999 | Gleckman | 313/578 |
| 5,926,243 A | 7/1999 | Kim | 349/138 |
| 5,999,237 A | 12/1999 | Miyawaki et al. | |
| 6,043,591 A | 3/2000 | Gleckman | 313/110 |
| 6,075,581 A | 6/2000 | Shirochi | |
| 6,094,181 A | 7/2000 | Hildebrand et al. | |
| 6,094,245 A | 7/2000 | Ochi et al. | 349/96 |
| 6,222,677 B1 | 4/2001 | Budd et al. | |
| 6,288,700 B1 * | 9/2001 | Mori | 345/102 |
| 6,862,053 B2 * | 3/2005 | Lee et al. | 349/58 |

(Continued)

FOREIGN PATENT DOCUMENTS

DE    3408176 A1    9/1985

(Continued)

OTHER PUBLICATIONS

CyberDisplay™, "CyberDisplay™ 320 Monochrome Display Model 290 KCD-QD01-BA", Kopin Corporation, Feb. 22, 2001.

*Primary Examiner*—David Nelms
*Assistant Examiner*—Richard Kim
(74) *Attorney, Agent, or Firm*—Hamilton, Brook, Smith & Reynolds, P.C.

(57) ABSTRACT

A display module includes a display, a first polarizer and a second polarizer. The polarizers can be located at a distance from the image plane of the display to remove the visibility of optical defects located within the polarizer or between the polarizer and display. The display module can also include at least one lens for magnifying the image produced by the display. The display module can also include a backlight having a first polarizer, a second polarizer and a light source.

48 Claims, 11 Drawing Sheets

U.S. PATENT DOCUMENTS

2002/0098344 A1* 7/2002 Mizuno et al. ............ 428/334

FOREIGN PATENT DOCUMENTS

| JP | 03189618 | | 8/1991 |
| JP | 05165015 | | 6/1993 |
| JP | 6 273760 A | | 9/1994 |
| JP | 06258637 | | 9/1994 |
| JP | 06273760 | * | 9/1994 |
| JP | 7-177398 | | 7/1995 |
| JP | 07225375 | | 8/1995 |
| JP | 9 160010 | | 6/1997 |
| JP | 2000075289 | | 3/2000 |
| JP | 2001 318614 | | 11/2001 |
| JP | 2001 356702 A | | 12/2001 |
| WO | WO 98/19435 | | 5/1998 |
| WO | WO 99/23636 | | 5/1999 |

* cited by examiner

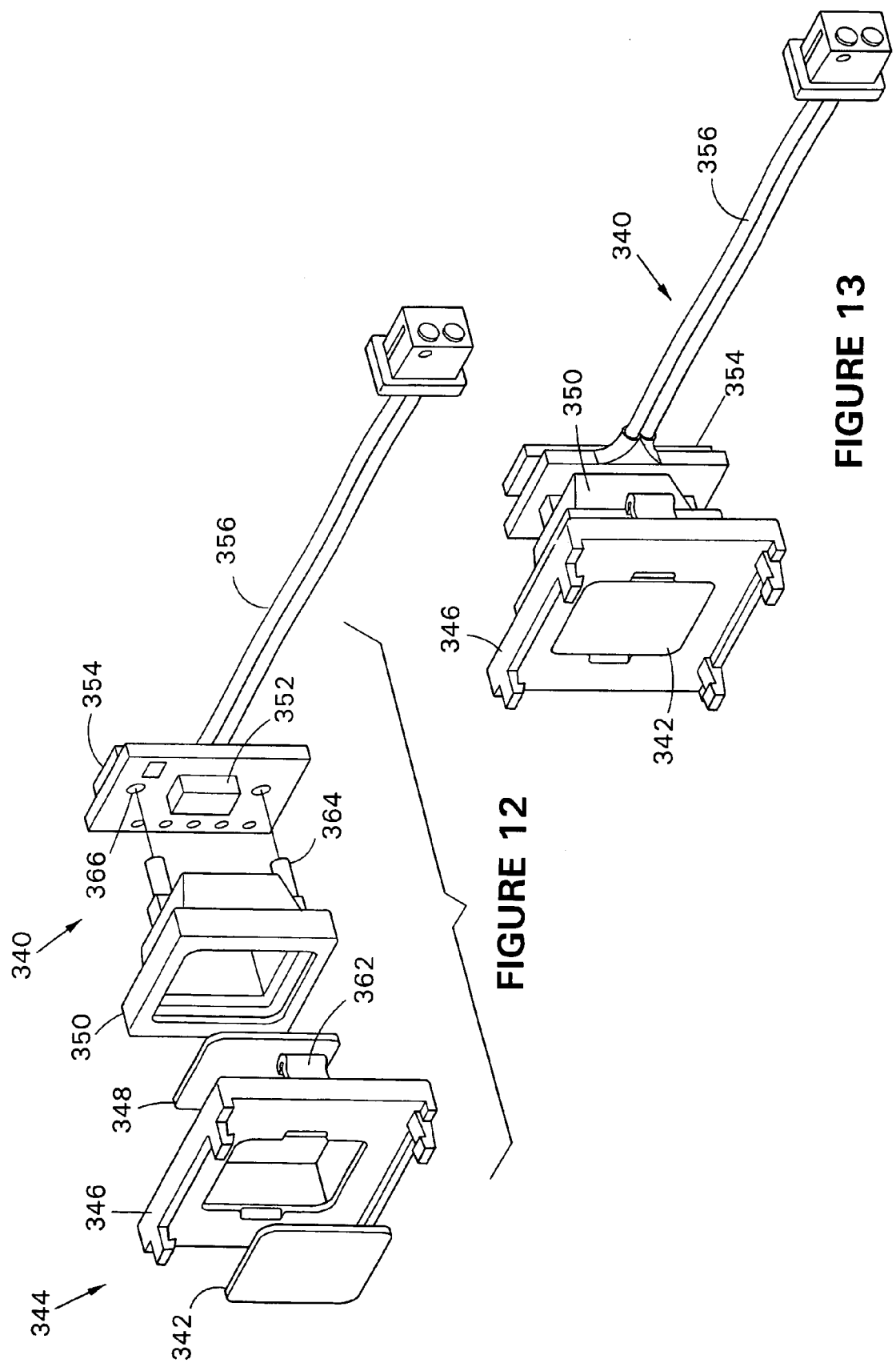

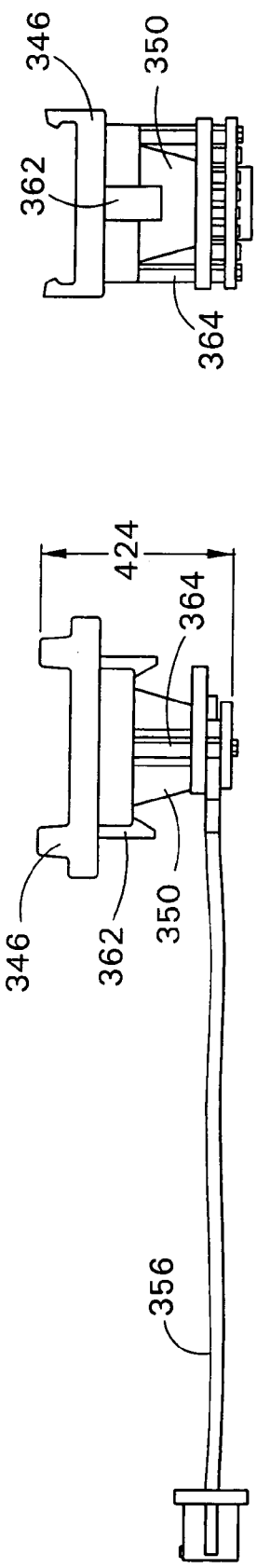
FIGURE 16
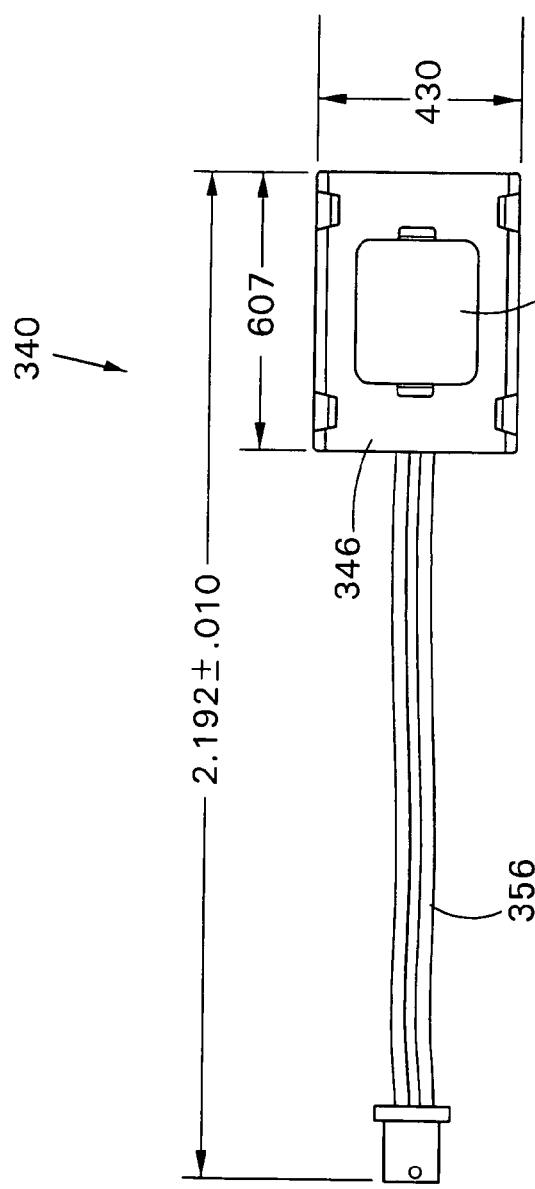
FIGURE 14
FIGURE 15

POLARIZER REMOVAL IN A MICRODISPLAY SYSTEM

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include at least five different layers: a light source, a first polarizing filter that is mounted on one side of a circuit panel on which the TFTs are arrayed to form pixels, a counterelectrode, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

SUMMARY OF THE INVENTION

A display module includes a display having a first surface and a second surface, a first polarizer located at a first distance from the first surface of the display and a second polarizer located at a second distance from the second surface of the display. The first distance reduces or removes the visibility of the first polarizer defects while the second distance removes or reduces the visibility of within the polarizer defects.

Defects of less than 15 micrometers in size such as located in either polarizer can produce visible changes in the displayed image as seen by a viewer after image filtration by a lens. Defects of less than 20 micrometers in size such as located between the polarizers and the surfaces of the display can also cause a visible change in a displayed image.

The display module can also include a housing where the display is mounted within the housing. The housing can have a first housing element and a second housing element where the first polarizer is held within the first housing element and the second polarizer is held within the second housing element. The first distance between the first polarizer mounted within the first housing element and the first surface of the display is approximately 0.8 mm. The first distance, however, can be within the range of 0.5 mm and 17 mm. The second distance between the second polarizer and the display can be less than 2.5 cm. Alternately, the second polarizer can be located on the second surface of the display.

The display module can include at least one lens where the first polarizer is located between the display and the at least one lens. The display of the display module can include a microdisplay.

The display module can also include a backlight. The backlight comprises a light source, a first diffuser and a second diffuser. In one embodiment, a first distance between the light source and the second diffuser is approximately 3.8 mm. A second distance located between the first diffuser and the second diffuser is approximately 2.3 mm.

The display module can also include a display having an image plane, a first polarizer located at a first distance from the image plane and a second polarizer located at a second distance from the image plane. The first distance and the second distance minimizing the visibility of defects located within the first polarizer and the second polarizer. Alternately, the second polarizer can be located on a surface of the display.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 12-17 illustrate an embodiment of a backlight for a display; and

DETAILED DESCRIPTION OF THE INVENTION

Figure 1:
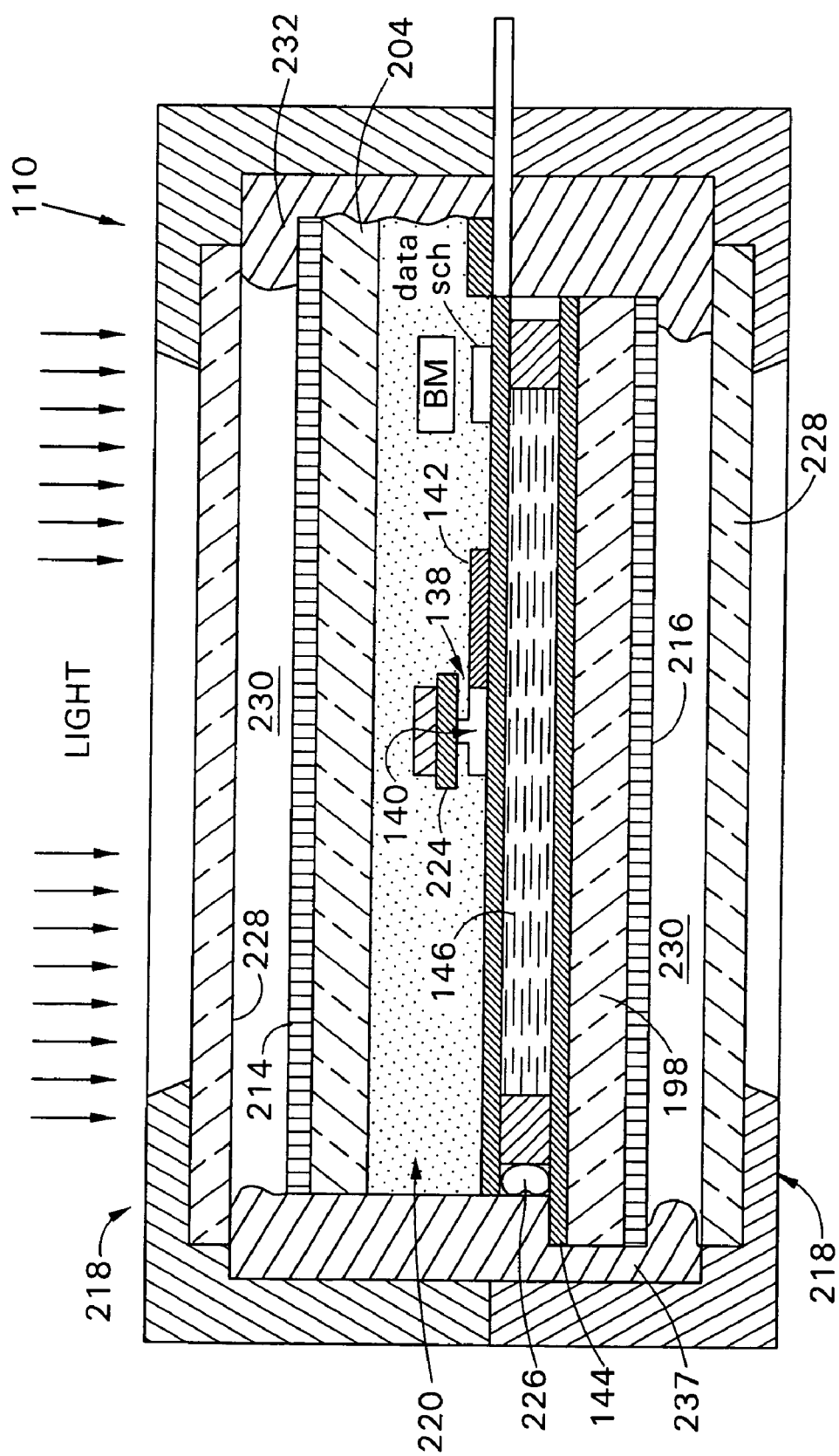
FIG. 1 is an enlarged sectional view of a microdisplay in a housing.

Referring to FIG. 1, a sectional view of a display 110 is shown. For clarity the elements of the display are not shown to scale, only one pixel element is shown and certain elements have not been shown. The display 110 has an active matrix portion 220 including the pixel element 138 spaced from the counterelectrode 144 by the interposed liquid crystal material layer 146. Each pixel element 138 has a transistor 140 and a pixel electrode 142. The active matrix portion 220 can have aluminum light shields 224 to protect the transistor (TFT) 140 if the active matrix is used for projection requiring high luminance light. The counterelectrode 144 is connected to the reset of the circuit by solder bumps 226. The matrix 220 is bounded by a pair of glass substrates 198 and 204. A first polarizer 214 is attached to the first glass substrate 204 and a second polarizer 216 is attached to the second glass substrate 198. Each of the glass substrates 198 and 204 has the respective polarizer 216 and 214 on the side opposite the layer of liquid crystal 146. In this embodiment, there is effectively no gap or distance separating the polarizers 214 and 216 from the glass 204 and 198. An additional pair of glass plates 228 are located outboard of the active matrix portion 220. The glass plates 228 are spaced from the polarizers 214 and 216 to define an insulation layer 230. The module 218 of the display 110 is a two-piece case which contains the active matrix portion 220, the glass plates 228 and the polarizers 214 and 216. A room temperature vulcanization (RTV) rubber 232 helps maintain the elements in the proper position in the module 218.

Descriptions of the manufacture and assembly of displays are described in U.S. patent application Ser. No. 09/643,655 which was filed on Jul. 28, 2000, in U.S. patent application Ser. No. 09/309,155 filed on May 10, 1999 and U.S. patent application Ser. No. 08/966,985 filed on Oct. 8, 1998, the entire contents of the above applications being incorporated by reference.

When an eye of a user is looking at the display 110, the eye is focusing on the image created by the twisting of the liquid crystal 146. When the display 110 is viewed through a lens, such as described below with respect to FIG. 7, the liquid crystal 146 is located at the focal plane. An image plane is defined as the plane the eye focuses on, the liquid crystal 146, and is the focal plane in a system having a lens 316.

The eye viewing the display 110 has a depth of field or depth of focus which is a depth that is in focus to the eye and includes the image plane.

To minimize or remove the effect of polarizer defects on an image produced by the display, the polarizers can be moved to a distance from the image plane of the display. The polarizer defects can be located within the polarizers or can be located between the polarizers and glass substrates. For example, the size of defects located within the polarizers can be less than approximately 15 micrometers in size and are generally less than 10 micrometers in size. Defects formed between the polarizers and glass substrates, such as dust particles, are approximately 20 microns in size, for example. The first and second polarizers can be placed at some distance away from the glass substrates of the microdisplay such that the polarizers are not in direct contact with the substrates. Placement of the polarizers away from the substrates removes the polarizers from the image plane of the display. Such positioning reduces or removes the contribution of defects to an image produced by the display.

The display 110 has an image plane located in the center of the display 110 and in the liquid crystal. Because of the relatively small size of the display, placement of the polarizers 214 and 216 on the glass substrate 204 and 198 of the display 110 essentially locates the polarizers 214 and 216 in the image plane of the display 110 and within the depth of focus of a user. During operation, a user views the image plane of the display 110 to receive image data. When a user views the display 110 through polarizer 214 in the image plane of the display 110 and in his depth of focus, the user can observe defects in the polarizer 214 less than 15 micrometers in size. Moving the polarizers 214 and 216 away from the image plane of the display 110 and out of the depth of focus of the display 110 removes the visibility of defects. These defects can be located within the polarizers 214 and 216 or located between the polarizers 214 and 216 and glass substrates 204 and 198. For example, with the first polarizer 214 removed from the image plane of the display 110, a user can focus on the image plane of the display 110 without focusing on the polarizer 214. Therefore, with such positioning, the polarizer 214 is not in the user's focal plane and the user does not view the defects in the polarizer.

Figure 2:
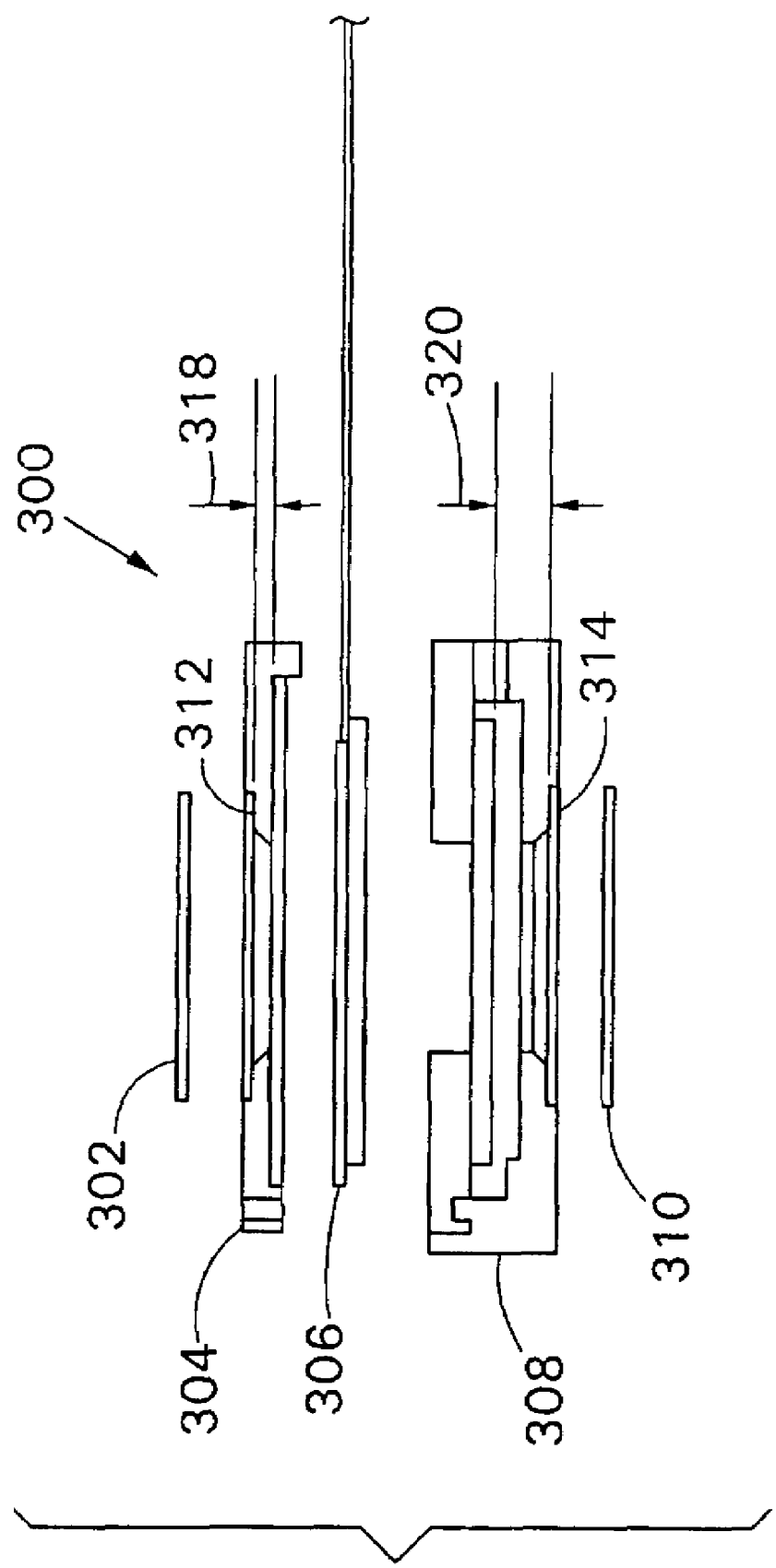
FIG. 2 illustrates an exploded view of a display module.

FIG. 2 illustrates an embodiment of a display module 300. The display module 300 includes a first polarizer or output (i.e. image transmitting) polarizer 302, a housing having a first housing element 304 and a second housing element 308, a display 306, and a second polarizer or input polarizer 310.

Preferably, the polarizers 302 and 310 are coated with an anti-reflective coating to minimize reflections from a light source.

Figure 3:
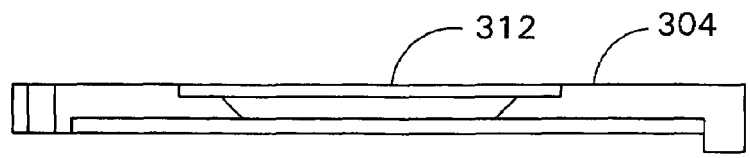
FIGS. 3 and 4 show a first housing portion.
Figure 4:
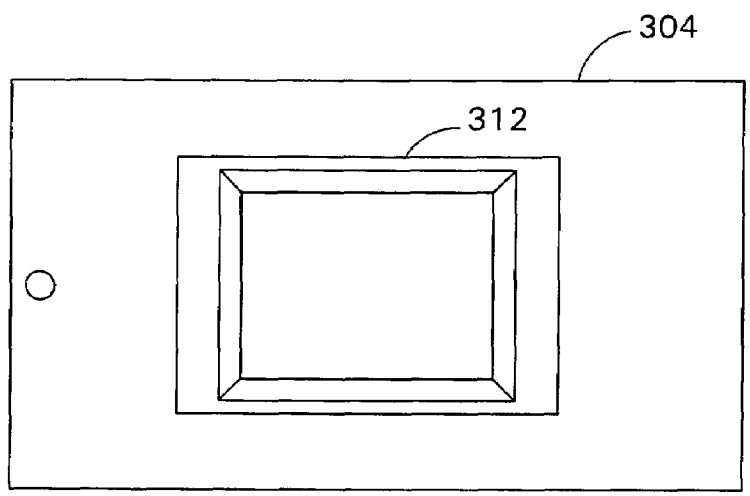

The output polarizer 302 is mounted within the first housing element 304 that includes a receptacle 312, illustrated in FIGS. 3 and 4, used to hold the first polarizer 302 within the housing element 304. Preferably, the receptacle 312 mechanically secures the first polarizer 302 with the housing 304 such than an adhesive is not required on the first polarizer 302. The receptacle 312 is positioned within the first housing element 304 such that a distance 318 is formed between the first polarizer 302 and a first surface of the display 306. This distance 318 separates the polarizer 302 from the first surface or glass substrate of the display 306 and moves the first polarizer 302 away from the image plane of the display 306, thereby decreasing the visibility of defects within the first polarizer 302.

Figure 5:
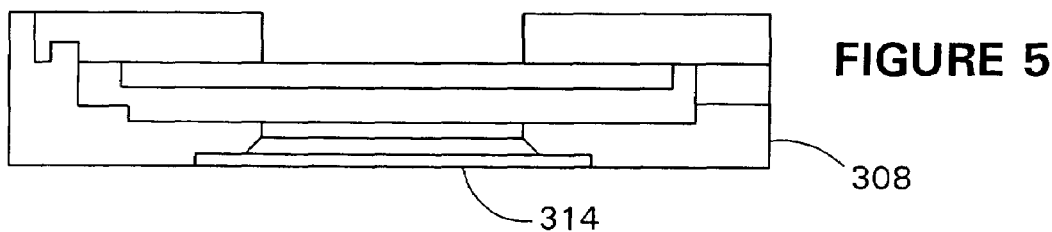
FIGS. 5 and 6 illustrate a second housing portion.
Figure 6:
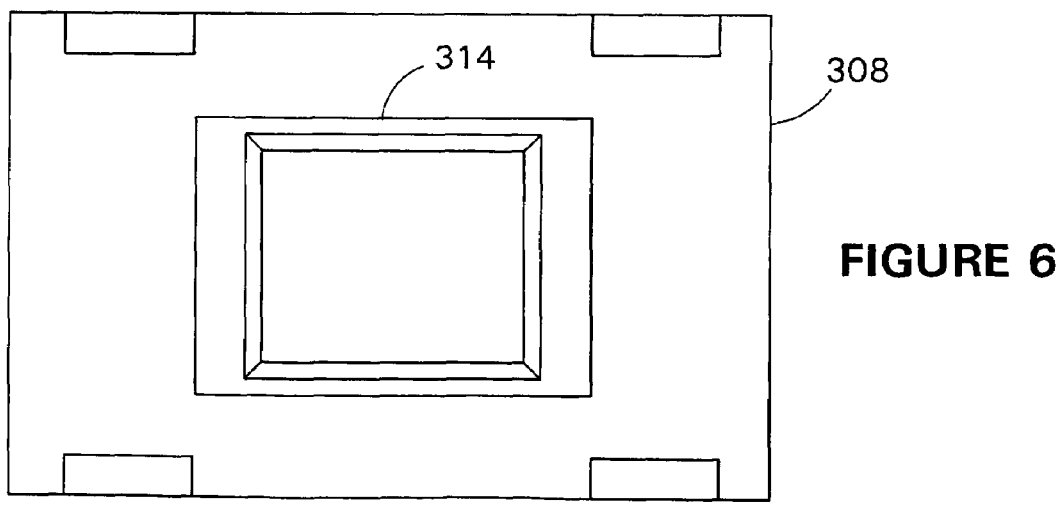

The display 306 mounts within the second housing element 308 such that attachment of the first housing element 304 to the second display element 308 encloses the display 306. The second display element 308 also includes a receptacle 314, as shown in FIGS. 5 and 6, used to hold the second polarizer 310 within the housing 308. The receptacle 314 can position the second polarizer 310 at a distance 320 away from the display 306. The receptacle 314 mechanically secures the second polarizer 310 within the housing element 308 such that an adhesive is not required on the second polarizer 310. This distance 320 separates the second polarizer 310 from the surface or glass substrate of the display 306 and moves the second polarizer 302 away from the focal plane of the display 306, thereby decreasing the visibility of defects within the second polarizer 310.

In one embodiment, when the polarizers 302 and 310 are received by the receptacles 312 and 314 the distance between the polarizers 302 and 310 and the image plane is approximately 1.5 mm from the image plane. The 1.5 mm includes 0.7 mm thickness of the display 110 to the center of the display 110, the image plane, and a gap of 0.8 mm.

Figure 7:
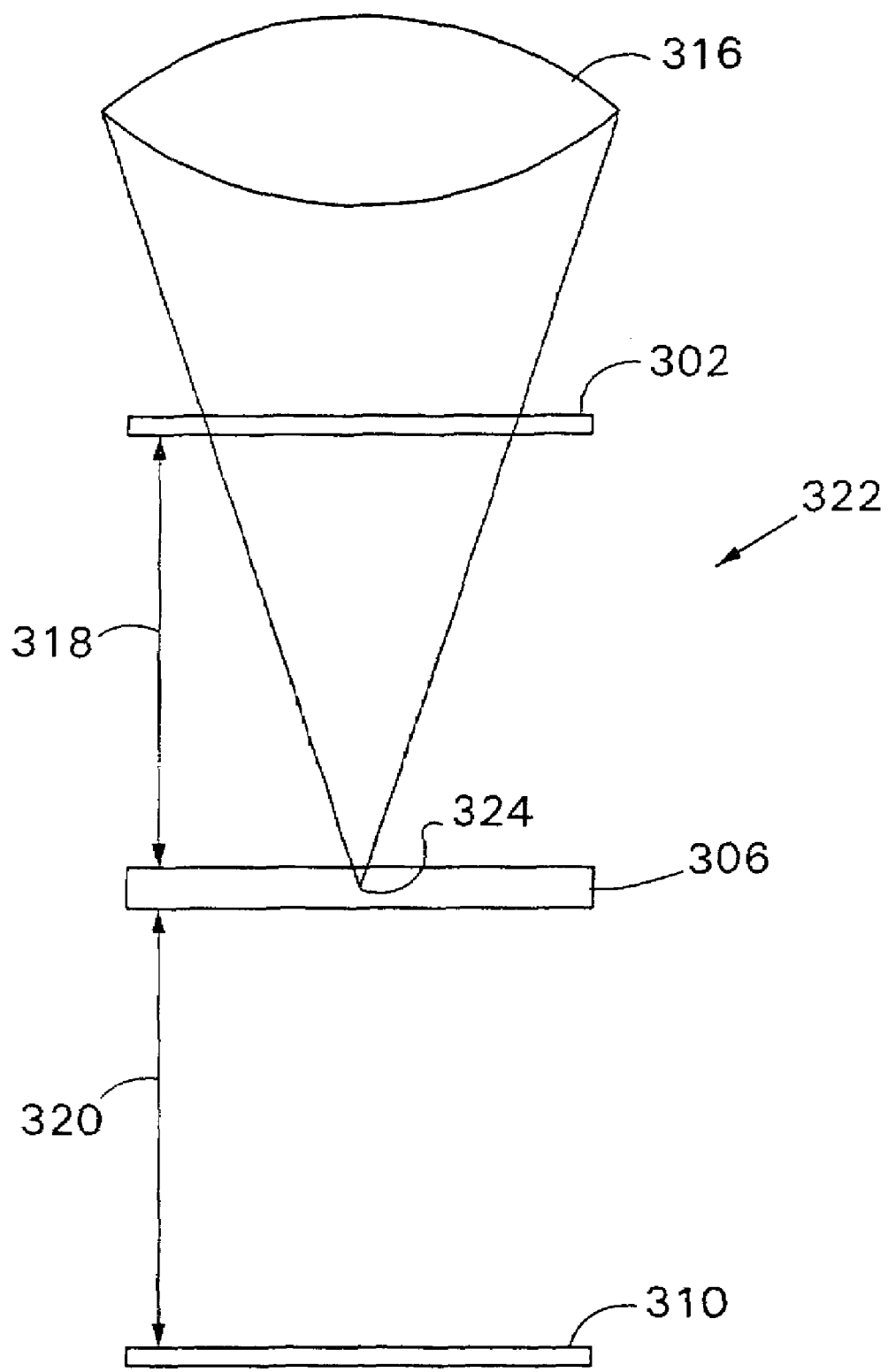
FIG. 7 illustrates an alternate embodiment of a display module.

An alternate embodiment of a display module, given generally as 322, is illustrated in FIG. 7. In this embodiment, a display 306, a first polarizer 302 and a second polarizer 310 are provided. A user can adjust or set the distance 318 between the first polarizer 302 and the display 306 and can set the distance 320 between the second polarizer 310 and the display 306. It is desired to move the first polarizer 302 out of the field of focus of the focal plane or image plane. In one embodiment, the first polarizer 302 can be set at a distance 318 away from the image plane of the display 306 within a range of 1.1 mm to 17.7 mm. In one embodiment, the preferred distance 318 is 16.7 mm. The second polarizer 310 can preferably be set at a distance 320 away from the image plane of the display 306 less than 2.5 cm. Distances greater than 2.5 cm can be used however.

The second polarizer 310 is mounted adjacent to a backlight used to transmit light through the display 306. Moving the second polarizer 310 away from the image plane of the display 306 can minimize either the visibility of defects within the second polarizer 310 or defects between the second polarizer 310 and display 306. However, as the distance 320 between the image plane of the display 306 and the backlight increases, an increase in the output of the backlight is needed to produce a greater amount of light to travel this increased distance and provide adequate illumination for the display 306. Therefore, while the second polarizer 310 can be moved away from the image plane of the display 306, it is preferred that the second polarizer be out of the field of focus, but not so far as to require an increase in distance between the display and the backlight so as to not require an additional light output of the backlight.

While it is desirable to have both polarizers 302 and 310 out of the depth of field or focus of the image plane (focal plane), in that the user views the image plane through the first polarizers 302, it is more critical that the first polarizers 302 is out of the depth of focus.

The display module 322 can also include at least one lens 316 used to magnify an image produced by the display 306. The at least one lens 316 can include either a first lens element or a plurality of lens elements, for example. The focal point of the lens 316 is located at the image plane of the display 306.

In one embodiment, the distance between the lens 316 and the display 306 is constant and, preferably, is 17 mm. The lens 316 is mounted in relation to the display 306 such that the first polarizer 302 is located between the lens 316 and the display 306. Arrangement of the lens 316, first polarizer 302 and display 306 in this order prevents the lens 316 from affecting the polarization of light from the display 306. For example, placing the lens 316 between the first polarizer 302 and display 306 can create reflections within the lens 316, which are then transmitted to the polarizer 302. Generally, such reflections are undesirable.

The distance 318 at which the first polarizer 302 is mounted from the display 306 is preferably within a range between 0.5 millimeters and 17 millimeters. Positioning of the first polarizer 302 at a distance 318 from the display 306 within this range creates no optical deficits during use of the display module 322.

Figure 8:
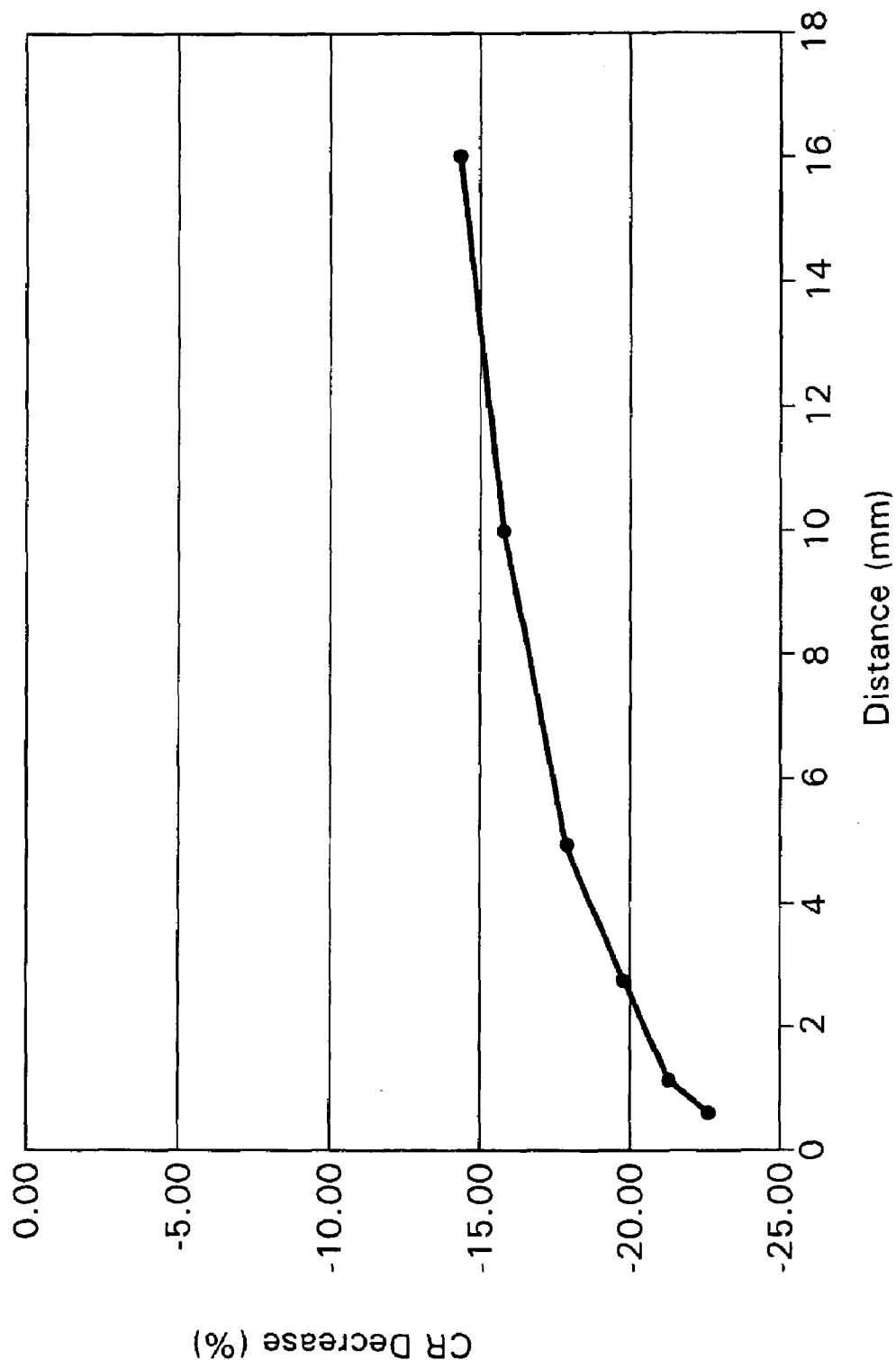
FIG. 8 illustrates the relationship between the contrast ratio of a display and the location of a first polarizer.

When positioning the first polarizer 302 at a distance 318 between 16 mm and 0.8 mm from the edge of the display 306, the contrast ratio of the display 306 decreases within a range of 14% and 23%, as shown in FIG. 8, compared to a polarizer positioned in contact with the display and less than 0.7 mm from the image plane of the display 306. (The display 306 has a thickness of 1.4 mm in one embodiment, so the edge of the display 306 to the focal or image plane is approximately 0.7 mm.) Contrast ratio is defined as the difference in brightness between the ratio of an all white output of the display 306 and an all black output of the display 306. The decrease in the contrast ratio by between 14% and 23%, is related to the distance 318 between the first polarizer 302 and the image plane of the display 306. However, a decrease in this range does not significantly affect the performance of the display 306 and is not visually perceptible by a user. As shown, a distance 318 of 16 mm between the polarizer and display 306 provides a smaller decrease in contrast ratio compared to distances less than 16 mm. Preferably, the distance 318 between the first polarizer 302 and the display is 16 mm to provide a minimal change in contrast ratio.

While decreases in contrast ratio by 23% do not affect the performance of the display 306, further decreases are also possible. For example, a decrease in contrast ratio by 40% to produce a 60:1 contrast ratio also does not significantly affect the performance of the display 306.

When positioning the first polarizer 302 at a distance 318 of 0.8 millimeters from the display 306, the flicker or the refresh rate of the display 306 and the color gain of the display 306 also remain unchanged. Color gain is defined as the difference in the color produced by a display compared to the color transmitted by the backlight.

Figure 9:
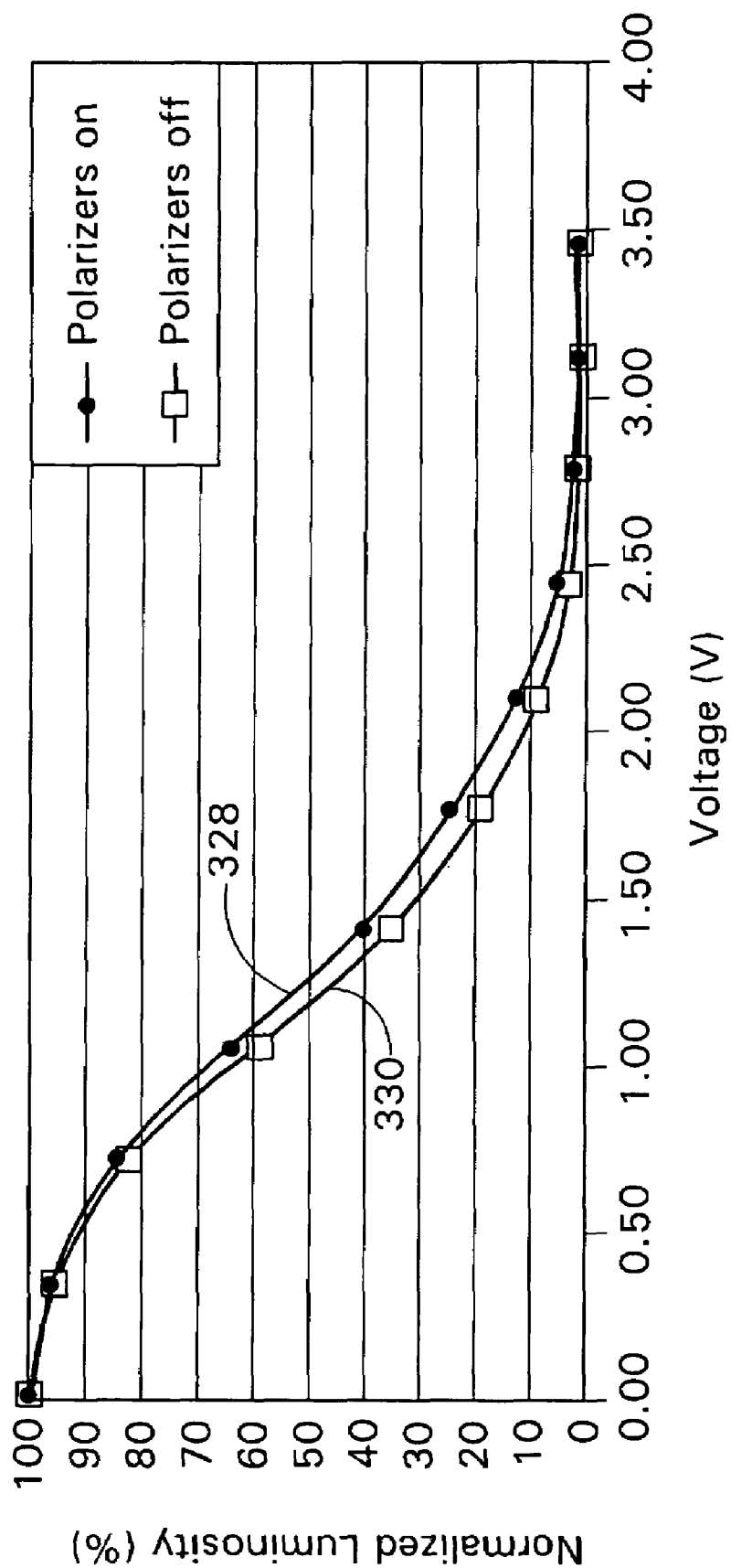
FIG. 9 illustrates the relationship between the brightness of a display and voltage.

Positioning the first polarizer 302 at a distance of 0.8 mm from the display 306 also does not affect the gamma value or brightness for the display 306. FIG. 9 illustrates a graph showing the relationship between brightness or luminosity and voltage for a display module 322 where the polarizer 302 is within the image plane of the display 306 and where the polarizer 302 is located away from the display 306 by a distance of 0.8 millimeters. A first curve 328 illustrates the relationship between brightness and voltage for a polarizer within the image plane of a display. A second curve 330 illustrates the relationship for a polarizer mounted at a distance away from the display. As shown, there is little variation between the brightness or gamma value of the display over a range of voltages when the polarizer 302 is either mounted within the image plane of the display 306 or is mounted at a distance 318 of 0.8 mm away from the display 306.

Figure 10:
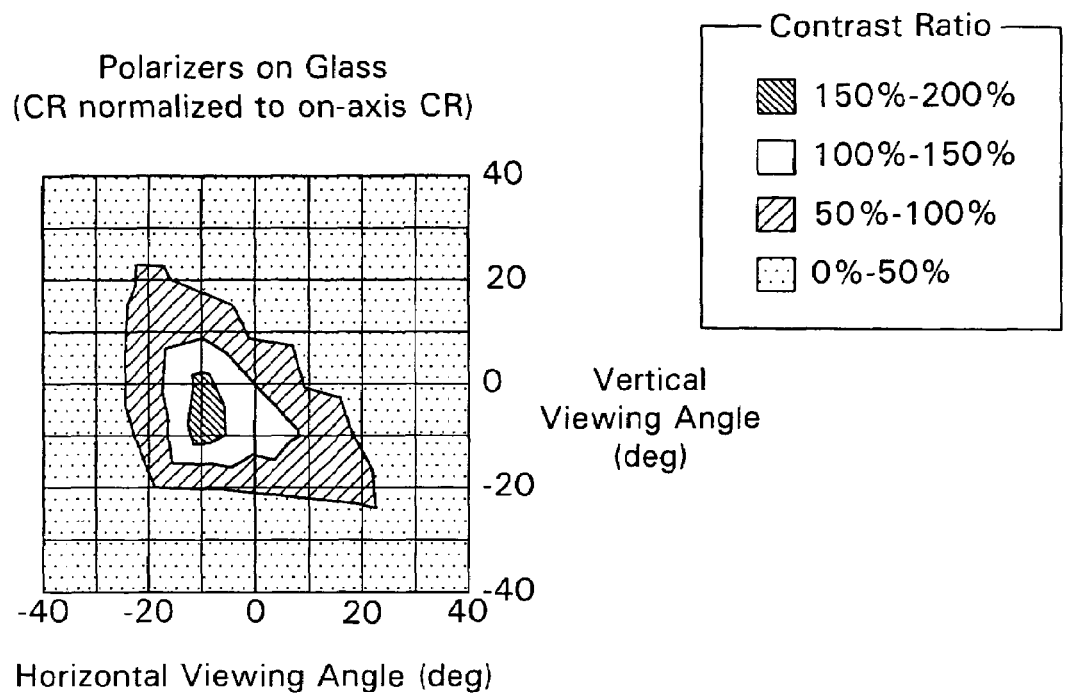
FIGS. 10 and 11 show the contrast ratios of the display at various viewing angles.
Figure 11:
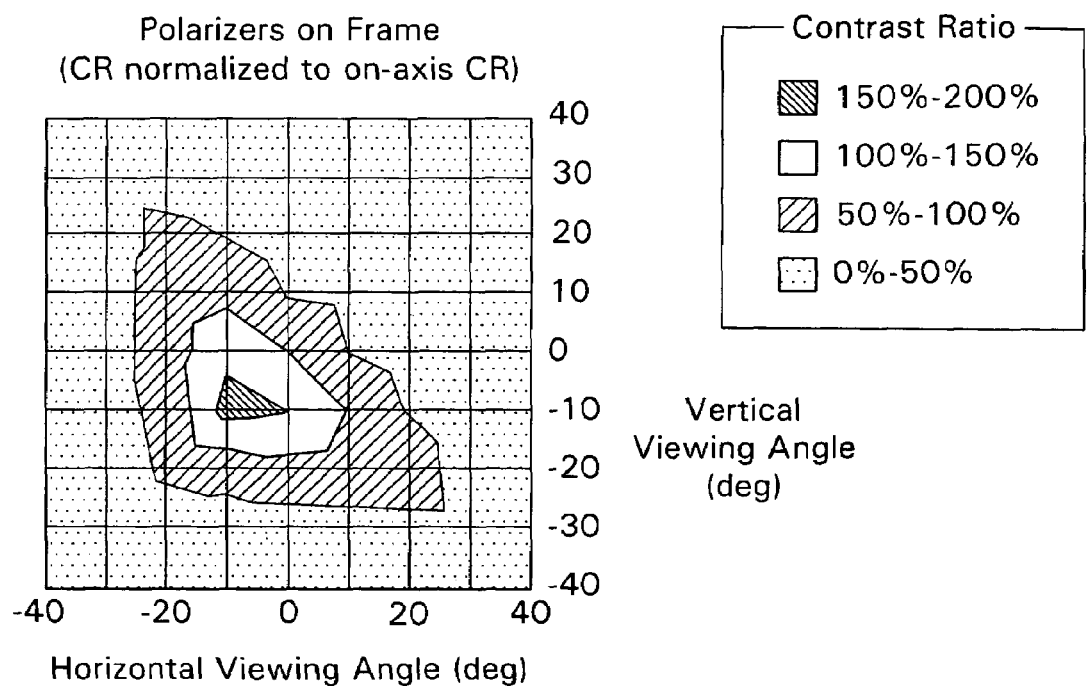

Mounting the polarizer 302 at a distance 318 of 0.8 mm from the display 306 also does not affect the relationship between contrast ratio and viewing angle of the display 306. Viewing angle is defined as the way in which the display 306 appears to a user, depending upon the angle at which the display 306 is viewed relative to a central axis of the display 306. FIG. 10 illustrates the relationship between contrast ratio and viewing angle for a polarizer mounted within the image plane of a display 306. FIG. 11 illustrates the relationship between contrast ratio and viewing angle for a polarizer mounted away from the display 306 by a distance of 0.8 millimeters. In comparing FIG. 10 and FIG. 11, the contrast ratio values for the display 306 are similar for similar viewing angles regardless of positioning of the polarizer 302. In both FIGS. 10 and 11, the contrast ratio decreases as a user views an image away from the central axis of the display 306.

Preferably, the first polarizer 302 and the second polarizer 302 are crossed polarizers such that the polarization portion of the first polarizer 302 is mounted at a 90° angle relative to the polarization portion of the second polarizer 310. Rotational variation between the polarizers 302, 310 and display 306 can occur, however, that can affect the contrast ratio of the display 306.

The contrast ratio of the display 306 is not affected by rotation of the first polarizer 302 relative to the second polarizer 310. Table 1 shows the relationship between rotation or angular offset of the first polarizer 302 and contrast ratio.

TABLE 1

| Angular Offset (degrees) | Contrast Ratio Decrease |
| --- | --- |
| +1 | −1.6% |
| −1 | −3.5% |
| +3 | −15.4% |
| −3 | −20.6% |

A rotational offset of +/−3° of the first polarizer relative to the second crossed polarizer does not adversely affect the contrast ratio of the display 306. The decrease in contrast ratio, shown in Table 1, is in addition to any changes in contrast ratio caused by positioning the first polarizer 302 a distance 318 away from the image plane of the display 306. When the first polarizer 302 is mounted relative to the second polarizer 310, the rotational accuracy of the first polarizer 302 is preferably within +/−3° relative to the second polarizer 310.

The rotational alignment of the display 306 with respect to the first 302 or second 310 polarizer does not adversely affect the contrast ratio of the display 306. The liquid crystal has a polarization also and therefore alignment of polarizer angle was study. For example, Table 2 shows the relationship between angular offset of the display 306 and contrast ratio of the display 306.

TABLE 2

| Angular Offset (degrees) | Contrast Ratio Decrease |
|---|---|
| +1 | +0.5% |
| −1 | −0.2% |
| +3 | +1.2% |
| −3 | −1.5% |
| +5 | +1.7% |
| −5 | −3.2% |

The offset of +/−5° does not affect the contrast ratio by an amount detectable by a user. However, this offset of +/−5° can be noticeable to a user and preferably, the offset is set at less than approximately +/−2°.

The display module described above can include a backlight. FIGS. 12 through 17 illustrate an embodiment of a backlight, given generally as 340. The backlight 340 includes a first diffuser 342 and a second diffuser 348, each mounted within a housing 344. The housing 344 can include a first housing element 346 and a second housing element 350 where the first diffuser 342 is secured to the first housing element 346, while the second diffuser 348 is secured to the second housing element 350. The first housing element 346 can include a first housing attachment mechanism 362 that couples the first housing element 346 to the second housing portion 350. The attachment mechanism 362 can be an interlocking device that prevents separation of the first 346 and second 350 housing portions.

The backlight 340 also includes a light source 352. Preferably, the light source 352 is a light emitting diode (LED). The light source 352 can be connected to a housing 354 such as a circuit board. The light source 352 is connected to a connector 356 that provides power to the light source 352. The second housing element 350 attaches to the housing 354 of the light source 352 by a second housing attachment mechanism 364. For example, the second attachment mechanism 364 can be mounted with apertures 366 within the housing 354 and attached by fasteners.

In one embodiment discussed above, the display is an active matrix liquid crystal display having an active area of 4.8 millimeters by 3.6 millimeters. The display has a resolution of 320 by 240 pixels.

In another embodiment, the display uses a three lens system. The closest lens is 6 mm from the display. The display, an active matrix liquid crystal, has an active area of 7.68 millimeters by 5.6 millimeters. The display has a resolution of 640 by 480 pixels. The polarizer in one embodiment is placed between the display and lens and in close proximity to the lens.

Figure 17:
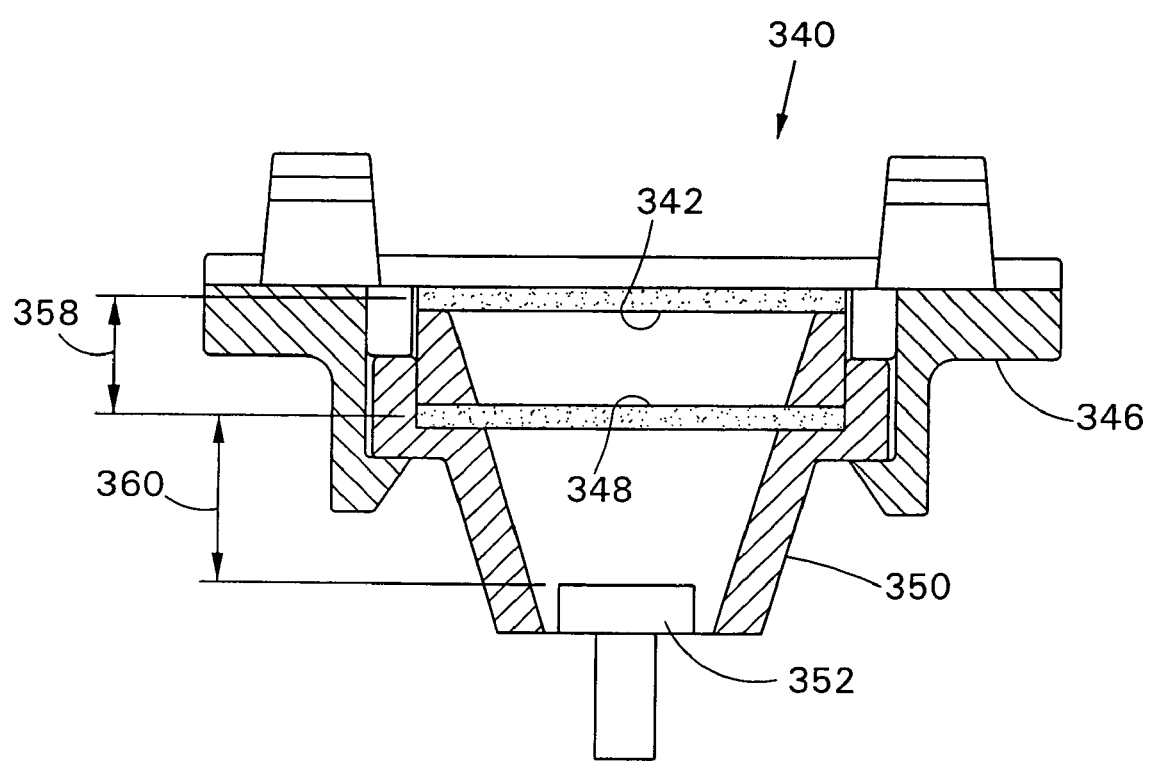

FIG. 17 illustrates a cross-sectional view of a backlight 340 and shows the spacing between the light source 352, first diffuser 342 and second diffuser 348. These spacings or distances can affect the performance of the backlight 340. A first distance 360 is located between the light source 352 and the second diffuser 348.

In one embodiment, the first distance 360 is equal to approximately 0.150 inches (3.81 mm) and provides an optimum level of uniformity of brightness produced by the backlight 340 onto a display. It was found for example in this particular embodiment that positioning the second diffuser 348 at a distance 360 less than 3.81 mm in relation to the light source 352 decreases uniformity of brightness as provided by the backlight 340. Moving the second diffuser 348 closer to the light source 352 concentrates the light to a fairly narrow area which, in turn produces a bright spot on the second diffuser 348 that is transferred to a display. Conversely, positioning the second diffuser 348 at a distance 360 greater than 3.81 mm from the light source 352 decreases the intensity of light as delivered to the second diffuser by the light source 352.

There is also a second distance 358 located between the second diffuser 348 and the first diffuser 342. In this embodiment, this second distance 358 is equal to approximately 0.090 inches (2.29 mm). This distance 358 is optimized to provide a uniformity of brightness from the light source 3D to the display. Positioning the first diffuser 342 at a distance 358 less than 2.29 mm from the second diffuser 348 reduces the uniformity of brightness provided from the light source 352 to the display. Positioning the first diffuser 342 at a distance greater than 2.29 mm from the second diffuser 348 decreases the intensity of light delivered to the display.

Figure 18:
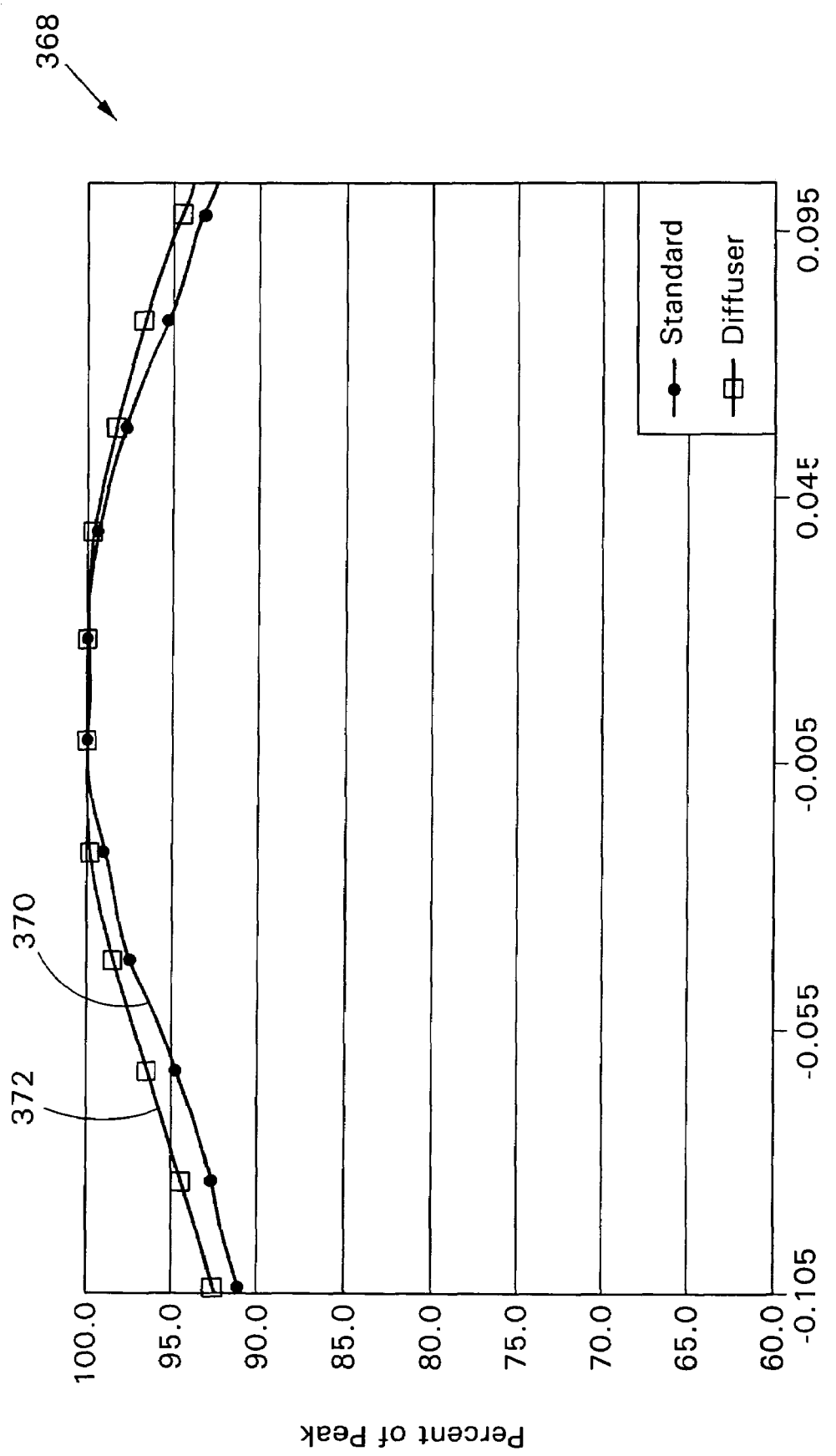
FIG. 18 illustrates a graph showing brightness uniformity across the display.

A brightness enhancing film (BEF) is typically used in backlights. In the above described embodiment, the BEF is replaced by the second diffuser 348. FIG. 18 shows a comparison between a backlight having a BEF and a backlight having a diffuser. The graph 368 illustrates backlight brightness uniformity across the length of a display. The graph 368 shows brightness as a percentage of a peak brightness measured at the brightest point on the display, typically, the center of the backlight. The graph 368 shows that the brightness produced across a display using a BEF, as illustrated by curve 370, is not significantly different than the brightness produced across the display by a second diffuser, illustrated by curve 372. Both curves 370, 372 show an approximate uniform brightness across a display's length. Therefore, a second diffuser can be used in place of a BEF with no adverse affects on brightness uniformity across a display.

The use of a second diffuser in place of a BEF also does not affect the maximum output of the backlight. In comparing the maximum output of the standard backlight using the BEF compared to using the second diffuser, use of the second diffuser decreases the maximum output of the backlight by approximately 4.4%. This decrease is not significant and does not affect the performance of the backlight.

While this invention has been particularly shown and described with references to preferred embodiments thereof, it will be understood by those skilled in the art that various changes in form and details may be made therein without departing from the scope of the invention encompassed by the appended claims.

What is claimed is:

1. A display system comprising:
a housing having an aperture;
a liquid crystal display panel having an image plane, and opposed transparent substrates defining first and second sides of the display panel, at least one substrate being directly mounted to and within the housing so as to position the display panel in optical alignment with the aperture; and
a first polarizer disposed relative to the first side of the display panel, the first polarizer being mounted to be optically aligned with the aperture and mechanically spaced by the housing from the image plane by a distance such that visibility of first polarizer defects to a viewer is minimized, the first polarizer being held within a first receptacle in the housing, the first receptacle mechanically securing the first polarizer with an interference fit.

2. The display system of claim 1 wherein the first polarizer defects can have a size greater than 10 micrometers.

3. The display system of claim 1 further comprising a second polarizer disposed relative to the second side of the display.

4. The display system of claim 3 wherein the second polarizer is spaced from the image plane by a distance such that second polarizer defects are out of the viewer's depth of focus.

5. The display system of claim 4 wherein the first and second polarizer defects can have a size greater than 10 micrometers.

6. The display system of claim 4 in which the second polarizer is mechanically spaced from the image plane by the housing.

7. The display system of claim 6 in which the second polarizer is mechanically secured by the housing.

8. The display system of claim 7 wherein the second polarizer is secured within a second receptacle in the housing.

9. The display system of claim 1 in which the housing comprises a plurality of housing elements.

10. The display system of claim 1 further comprising a backlight.

11. The display system of claim 10 wherein the backlight comprises a light source, a first diffuser and a second diffuser.

12. The display system of claim 11 wherein the light source is a light emitting diode (LED).

13. The display system of claim 3 in which the display has a first surface and a second surface, the first polarizer being located at a first distance from the first surface of the display, and the second polarizer being located on the second surface of the display.

14. The display system of claim 1 further comprising at least one lens.

15. The display system of claim 14 wherein the first polarizer is located between the display and the at least one lens.

16. The display system of claim 1 in which the first polarizer is substantially parallel to the display.

17. The display system of claim 1 in which the display has a diagonal that is less than one inch.

18. A display system comprising:
a housing having an aperture;
a liquid crystal display panel having an image plane, and opposed transparent substrates defining first and second sides of the display panel, at least one substrate being directly mounted to and within the housing so as to position the display panel in optical alignment with the aperture;
a first polarizer disposed relative to the first side of the display panel, the first polarizer being mounted to be optically aligned with the aperture and mechanically secured and spaced by the housing from the image plane by a distance such that visibility of first polarizer defects to a viewer is minimized; and
a second polarizer disposed relative to the second side of the display panel, the second polarizer mechanically secured and spaced by the housing from the image plane by a distance such that visibility of second polarizer defects to a viewer is minimized, the first and second polarizers being held within respective first and second receptacles in the housing, the first and second receptacles mechanically securing the first and second polarizers with an interference fit.

19. A display system comprising:
a housing comprising a plurality of housing elements and having an aperture;
a liquid crystal display panel having an image plane, and opposed transparent substrates defining first and second sides of the display panel, at least one substrate being directly mounted to and within the housing so as to position the display panel in optical alignment with the aperture; and
a first polarizer disposed relative to the first side of the display panel, the first polarizer being mounted to be optically aligned with the aperture and mechanically secured and spaced by the housing from the image plane by a distance such that visibility of first polarizer defects to a viewer is minimized, the first polarizer being held within a first receptacle in the housing, the first receptacle mechanically securing the first polarizer with an interference fit.

20. A display system comprising:
a housing having an aperture;
a liquid crystal display panel having an image plane, and opposed transparent substrates defining first and second sides of the display panel, the first side having a first surface and the second side having a second surface, at least one substrate being directly mounted to and within the housing so as to position the display panel in optical alignment with the aperture;
a first polarizer disposed relative to the first side of the display panel, the first polarizer being mounted to be optically aligned with the aperture and mechanically secured and spaced by the housing from the image plane by a first distance from the first surface of the display panel such that visibility of first polarizer defects to a viewer is minimized, the first polarizer being held within a first receptacle in the housing, the first receptacle mechanically securing the first polarizer with an interference fit; and
a second polarizer disposed relative to the second side of the display panel, the second polarizer being located on the second surface of the display panel.

21. A method for assembling a display module comprising:
providing a housing having an aperture;
providing a first polarizer and a liquid crystal display panel having an image plane, and opposed transparent substrates defining first and second sides of the display panel, at least one substrate being directly mounted to and within the housing so as to position the display panel in optical alignment with the aperture, and
mounting the first polarizer to be optically aligned with the aperture and, with the housing, mechanically spacing the first polarizer relative to the first side of the display panel by a distance such that visibility of first polarizer defects to a viewer is minimized, the first polarizer being held within a first receptacle in the housing, the first receptacle mechanically securing the first polarizer with an interference fit.

22. The method of claim 21 further comprising spacing the first polarizer such that the first polarizer defects can have a size greater than 10 micrometers and be out of the viewer's depth of focus.

23. The method of claim 21 further comprising disposing a second polarizer relative to the second side of the display.

24. The method of claim 23 further comprising spacing the second polarizer from the image plane by a distance such that second polarizer defects are out of the viewer's depth of focus.

25. The method of claim 24 further comprising spacing the first and second polarizers such that the first and second polarizer defects can have a size greater than 10 micrometers and be out of the viewer's depth of focus.

26. The method of claim 24 further comprising mechanically spacing the second polarizer from the image plane with the housing.

27. The method of claim 26 further comprising mechanically securing the second polarizer with the housing.

28. The method of claim 27 further comprising securing the second polarizer within a second receptacle in the housing.

29. The method of claim 21 further comprising providing the housing with a plurality of housing elements.

30. The method of claim 21 further comprising providing a backlight.

31. The method of claim 30 further comprising providing the backlight with a light source, first diffuser and a second diffuser.

32. The method of claim 31 further comprising providing the backlight with a light source that is a light emitting diode (LED).

33. The method of claim 23 in which the display has a first surface and a second surface, the first polarizer being located at a first distance from the first surface of the display, the method further comprising locating the second polarizer on the second surface of the display.

34. The method of claim 21 further comprising providing at least one lens.

35. The method of claim 34 further comprising locating the first polarizer between the display and the at least one lens.

36. The method of claim 21 further comprising positioning the first polarizer substantially parallel to the display.

37. The method of claim 21 further comprising providing the display with a diagonal that is less than one inch.

38. A method for assembling a display module comprising:
providing a housing having an aperture;
providing a first polarizer, a second polarizer, and a liquid crystal display panel having an image plane, and opposed transparent substrates defining first and second sides of the display panel, at least one substrate being directly mounted to and within the housing so as to position the display panel in optical alignment with the aperture,
mounting the first polarizer to be optically aligned with the aperture and, with the housing, mechanically securing and spacing the first polarizer relative to the first side of the display panel by a distance such that visibility of first polarizer defects to a viewer is minimized, and mechanically securing and spacing the second polarizer relative to the second side of the display panel by a distance such that visibility of second polarizer defects to the viewer is minimized, the first and second polarizers being held within respective first and second receptacles in the housing, the first and second receptacles mechanically securing the first and second polarizers with an interference fit.

39. A method for assembling a display module comprising:
providing a housing comprising a plurality of housing elements and having an aperture;
providing a first polarizer and a liquid crystal display panel having an image plane, and opposed transparent substrates defining first and second sides of the display panel, at least one substrate being directly mounted to and within the housing so as to position the display panel in optical alignment with the aperture; and
mounting the first polarizer to be optically aligned with the aperture and, with the housing, mechanically securing and spacing the first polarizer relative to the first side of the display panel by a distance such that visibility of first polarizer defects to a viewer is minimized, the first polarizer being held within a first receptacle in the housing, the first receptacle mechanically securing the first polarizer with an interference fit.

40. A method for assembling a display module comprising:
providing a housing having an aperture;
providing a first polarizer, a second polarizer, and a liquid crystal display panel having an image plane, and opposed transparent substrates defining first and second sides of the display panel, the first side having a first surface and the second side having a second surface, at least one substrate being directly mounted to and within the housing so as to position the display panel in optical alignment with the aperture;
mounting the first polarizer to be optically aligned with the aperture and, with the housing, mechanically securing and spacing the first polarizer relative to the first side of the display panel by a first distance from the first surface of the display panel such that visibility of first polarizer defects to a viewer is minimized, the first polarizer being held within a first receptacle in the housing, the first receptacle mechanically securing the first polarizer interference fit; and
disposing the second polarizer relative to the second side of the display panel, the second polarizer being located on the second surface of the display panel.

41. The display system of claim 1 in which the first polarizer is mechanically spaced by the housing from the image plane and mechanically secured to the housing in a manner where adhesion is not required.

42. The display system of claim 18 in which the first polarizer is mechanically spaced by the housing from the image plane and mechanically secured to the housing in a manner where adhesion is not required.

43. The display system of claim 19 in which the first polarizer is mechanically spaced by the housing from the image plane and mechanically secured to the housing in a manner where adhesion is not required.

44. The display system of claim 20 in which the first polarizer is mechanically spaced by the housing from the image plane and mechanically secured to the housing in a manner where adhesion is not required.

45. The method of claim 21 further comprising mechanically spacing the first polarizer relative to the first side of the display and mechanically securing the first polarizer to the housing in a manner where adhesion is not required.

46. The method of claim 38 further comprising mechanically spacing the first polarizer relative to the first side of the display and mechanically securing the first polarizer to the housing in a manner where adhesion is not required.

47. The method of claim 39 further comprising mechanically spacing the first polarizer relative to the first side of the display and mechanically securing the first polarizer to the housing in a manner where adhesion is not required.

48. The method of claim 40 further comprising mechanically spacing the first polarizer relative to the first side of the display and mechanically securing the first polarizer to the housing in a manner where adhesion is not required.

* * * * *